United States Patent
Geiselhart et al.

(10) Patent No.: US 12,254,024 B2
(45) Date of Patent: Mar. 18, 2025

(54) CONDITIONAL REPLICATION OF DATA

(71) Applicant: International Business Machines Corporation, Armonk, NY (US)

(72) Inventors: Reinhold Geiselhart, Rottenburg-Ergenzingen (DE); Frank Küster, Großbottwar (DE); Juergen Schimpf, Schoenaich (DE); Rene Blath, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 17/806,963

(22) Filed: Jun. 15, 2022

(65) Prior Publication Data

US 2023/0409594 A1   Dec. 21, 2023

(51) Int. Cl.
  *G06F 16/30* (2019.01)
  *G06F 16/27* (2019.01)

(52) U.S. Cl.
  CPC .................................. *G06F 16/27* (2019.01)

(58) Field of Classification Search
  CPC ..................................................... G06F 16/27
  See application file for complete search history.

(56) References Cited

U.S. PATENT DOCUMENTS

| | | | | |
|---|---|---|---|---|
| 8,429,359 B1* | 4/2013 | Desai | ............... | G06F 11/1461 |
| | | | | 711/E12.103 |
| 10,387,264 B1* | 8/2019 | Telichari | ............. | G06F 11/1435 |
| 10,929,428 B1* | 2/2021 | Brahmadesam | .... | G06F 16/2379 |
| 2010/0070475 A1* | 3/2010 | Chen | ................... | G06F 11/1461 |
| | | | | 711/E12.001 |

(Continued)

FOREIGN PATENT DOCUMENTS

| | | | |
|---|---|---|---|
| CN | 104516724 A | 4/2015 | |
| CN | 105279210 A | 1/2016 | |

(Continued)

OTHER PUBLICATIONS

Anonymous. "Db2 Data Gate on Cloud Pak for Data." Published Dec. 21, 2022. 3 pages. Published by IBM. https://www.ibm.com/docs/en/cloud-paks/cp-data/4.0?topic=services-db2-data-gate.

(Continued)

*Primary Examiner* — Khanh B Pham
(74) *Attorney, Agent, or Firm* — James L. Olsen

(57) ABSTRACT

A computer implemented method for synchronizing a first database with a second database. The method comprises a replication method comprising determining that a first change in the first database fulfils a defined tolerance range in response to detecting that the first change indicates a value of at least one selected attribute of the set of attributes, and determining that a second change in the first database does not fulfil the defined tolerance range in response to detecting that the second change indicates a value of at least one selected attribute of the set of attributes. The replication method further comprises preventing replication of the first change to the second database in response to determining that the first change fulfils the tolerance range, and replicating the second change to the second database in response to determining that the second change does not fulfil the tolerance range.

15 Claims, 10 Drawing Sheets

(56) References Cited

U.S. PATENT DOCUMENTS

| | | | |
|---|---|---|---|
| 2016/0026650 A1* | 1/2016 | Winters | G06F 16/2358 |
| | | | 715/739 |
| 2017/0116206 A1 | 4/2017 | Gumerato | |
| 2020/0065003 A1* | 2/2020 | Chopra | G06F 3/0619 |
| 2020/0174989 A1 | 6/2020 | Koza | |
| 2020/0274926 A1* | 8/2020 | Chakraborty | H04L 67/1097 |
| 2020/0285545 A1* | 9/2020 | Ashokkumar | H04L 67/1095 |
| 2021/0286775 A1 | 9/2021 | Beier | |

FOREIGN PATENT DOCUMENTS

| | | |
|---|---|---|
| CN | 105447054 A | 3/2016 |
| CN | 105786955 A | 7/2016 |
| CN | 111046052 A | 4/2020 |
| CN | 111448560 A | 7/2020 |
| CN | 111930782 A | 11/2020 |

OTHER PUBLICATIONS

Anonymous. "IBM Db2 Analytics Accelerator for z/OS." Printed Jun. 14, 2022. 11 pages. Machine Translated. Published by IBM. https://www.ibm.com/de-de/products/db2-analytics-accelerator?utm_content=SRCWW&p1=Search&p4-43700066788600262&p5=e&gclid=CjwKCAjwq9mLBhB2EiwAuYdMtbINEbmnSch4i86COGXaOEwhQ3Mt0zTwgZKsON_j8pevrfFOrPQcjhoCTm4QAvD_BwE&gclsrc=aw.ds.

Anonymous. "InfoSphere Data Replication 11.4.0." Printed Dec. 21, 2022. 2 pages. Published by IBM. https://www.ibm.com/support/knowledgecenter/en/SSTRGZ_11.4.0/com.ibm.idr.frontend.doc/pv_welcome.html.

Anonymous. "Making queries wait for incremental updates." Last updated May 11, 2021. 10 pages. Published by IBM. https://www.ibm.com/docs/en/daafz/5.1?topic=continually-making-queries-wait-incremental-updates.

Anonymous. "Mechanism for Automated Enablement of Replication from a Source Database System to a Target Database System." Published Nov. 11, 21. 8 pages. Published by IP.com. https://priorart.ip.com/IPCOM/000267627.

Anonymous. "Method to Skip Large Transaction Log Ranges in Incremental Database Change Replication Systems." Published Aug. 9, 2021. 5 pages. Published by IP.com. https://priorart.ip.com/IPCOM/000266669.

Anonymous. "Reservoir sampling." Last updated Mar. 1, 2022. 8 pages. Published by Wikipedia. https://en.wikipedia.org/wiki/Reservoir_sampling.

Wen, et al., "Approximate Edge Analytics for the IoT Ecosystem." Published May 15, 2018. 12 pages. Published by ARXIV. https://arxiv.org/pdf/1805.05674.pdf.

Wikipedia. "Sampling (signal processing)." Last updated Mar. 24, 2022. 10 pages. Published by Wikipedia. https://en.wikipedia.org/wiki/Sampling_(signal_processing).

Wikipedia. "Send-on-Delta-Abtastung." Last updated Dec. 2021. 2 pages. Published by Wikipedia. https://de.wikipedia.org/wiki/Send-on-Delta-Abtastung.

Wikipedia. "Standard deviation4." Printed Jun. 14, 2022. 1 page. Published by Wikipedia. https://en.wikipedia.org/wiki/Standard_deviation4.

Wikipedia. "Standard deviation." Last edited Jun. 11, 2022. 21 pages. Published by Wikipedia. https://en.wikipedia.org/wiki/Standard_deviation.

International Search Report and Written Opinion dated Oct. 10, 2023, for International Application No. PCT/IB2023/056066, filed Jun. 13, 2023.

* cited by examiner

CONDITIONAL REPLICATION OF DATA

BACKGROUND

The present disclosure relates to the field of digital computer systems, and more specifically, to synchronizing a first database with a second database.

Replication is a process of maintaining a defined set of data in more than one location. It may involve copying designated changes from one source location to a target location, and synchronizing the data in both locations. The source and target can be in logical servers that are on the same machine or on different machines in a distributed network. Several approaches exist for processing and moving data from one system to another. However, these approaches may need further improvement.

SUMMARY

Various embodiments provide a method, computer system and computer program product as described by the subject matter of the independent claims. Advantageous embodiments are described in the dependent claims. Embodiments of the present disclosure can be freely combined with each other if they are not mutually exclusive.

In one aspect, the disclosure relates to a computer implemented method for synchronizing a first database with a second database, the first database comprising a set of attributes. The method comprises a replication method comprising determining that a first change in the first database fulfils a defined tolerance range in response to detecting that the first change indicates a value of at least one selected attribute of the set of attributes, and determining that a second change in the first database does not fulfil the defined tolerance range in response to detecting that the second change indicates a value of at least one selected attribute of the set of attributes (these may be referred to as tolerance check steps). The replication method further comprises preventing replication of the first change to the second database in response to determining that the first change fulfils the tolerance range, and replicating the second change to the second database in response to determining that the second change does not fulfil the tolerance range.

In another aspect, the disclosure relates to a computer program product comprising a computer-readable storage medium having computer-readable program code embodied therewith, the computer-readable program code configured to implement all of steps of the method according to preceding embodiments.

In another aspect, the disclosure relates to a computer system for synchronizing a first database with a second database, the first database comprising a set of attributes. The computer system is configured for performing a replication method comprising determining that a first change in the first database fulfils a defined tolerance range in response to detecting that the first change indicates a value of at least one selected attribute of the set of attributes, and determining that a second change in the first database does not fulfil the defined tolerance range in response to detecting that the second change indicates a value of at least one selected attribute of the set of attributes (these may be referred to as tolerance check steps). The replication method further comprises preventing replication of the first change to the second database in response to determining that the first change fulfils the tolerance range, and replicating the second change to the second database in response to determining that the second change does not fulfil the tolerance range.

BRIEF DESCRIPTION OF THE DRAWINGS

In the following embodiments of the disclosure are explained in greater detail, by way of example only, making reference to the drawings in which.

DETAILED DESCRIPTION

Figure 1:
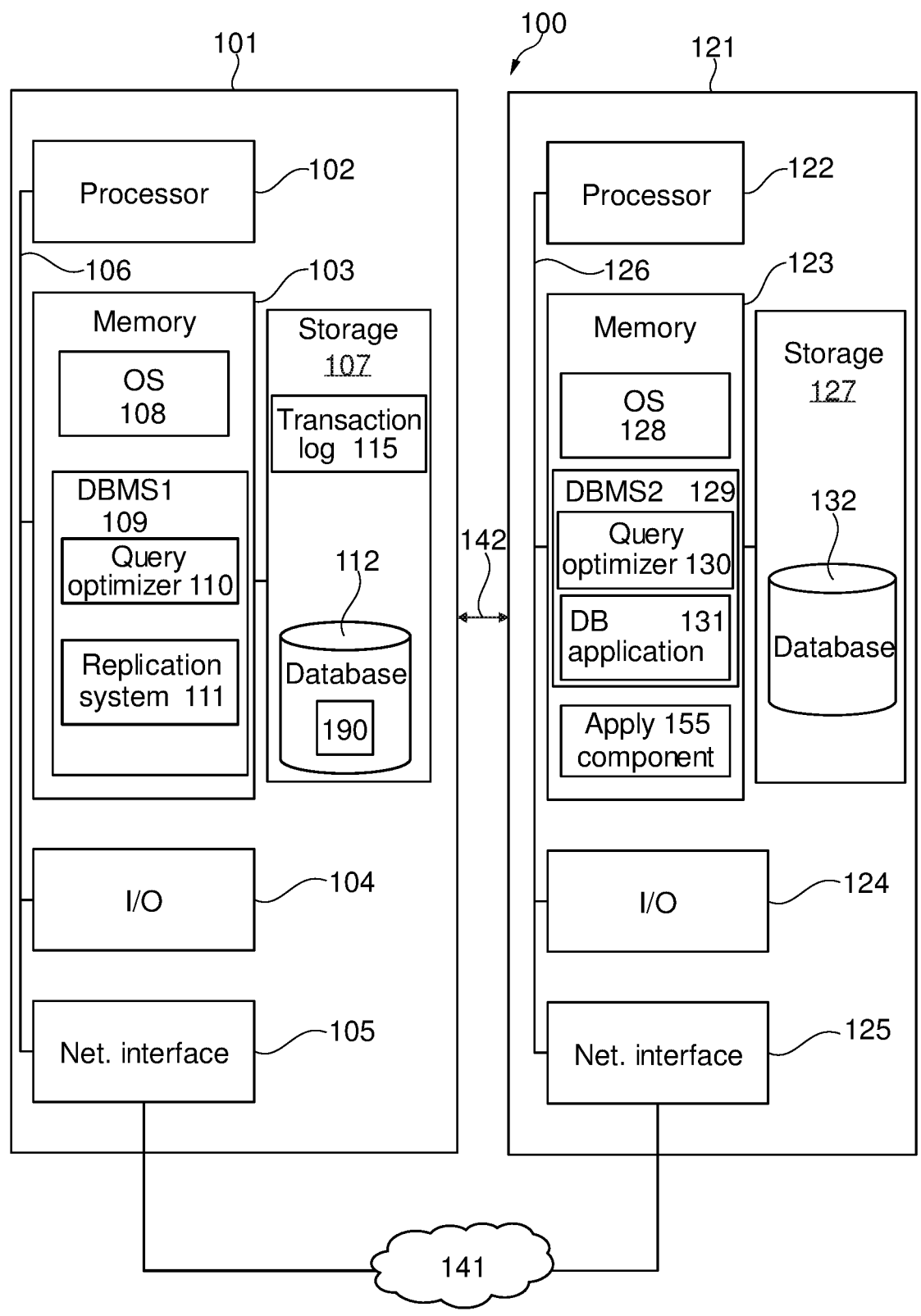
FIG. 1 depicts a computer system in accordance with an example of the present subject matter.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The first database may comprise one or more tables (named first tables). The first tables may comprise data records. A data record may be a collection of related attributes such as a name, date of birth and class of a particular entity. A record represents an entity instance, wherein an entity refers to a user, object, or concept about which information is stored in the record. The one or more first tables may comprise values of the set of attributes (named first set of attributes). For example, in case the number of first tables is higher than one, each of the first tables may comprise a respective subset of attributes of the first set of attributes. Each attribute of the first set of attributes may be represented by a column in the first tables. The values of the first set of attributes may be provided by one or more data sources. The data source may be a system where data originates from. The present subject matter may advantageously process the data based on their data source. For that, the first set of attributes may be classified dependent on their data source. For example, the first set of attributes may comprise attributes of a first type whose values are provided by one or more data streaming sources. The data streaming source may be a system that produces a data stream. The data stream may comprise time series comprising attribute values and associated timestamping. For example, a data streaming source may be a sensor, a website, a satellite, and the like. The first set of attributes may optionally further comprise attributes of second type whose values are provided by a non-streaming source. Thus, the set of attributes may comprise K attributes $X_1 \ldots X_K$ of the first type, where $K \geq 1$ and M attributes $Y_1 \ldots Y_M$ of the second type, where $M \geq 0$. If the number M of the second type attributes is higher than one the set of attributes $X_1 \ldots X_K$ may be referred to as a subset of attributes of the overall set of attributes.

The first database is associated with the second database so that similar data may be present in the two databases. This may advantageously be used in different contexts. For example, the first database and the second database may be part of a backup system where the second database may provide a backup of the first database. In another example, the first database and the second database may be part of a recovery system where the second database may be used instead of the first database in case of a failure of the first database. In another example, the first database and the second database may be part of an accelerator system where the second database may be used to process complex queries while the first database may process simplified queries. For that, the second database may comprise one or more second tables. The one or more second tables may comprise values of a second set of attributes. In one example, the second set of attributes may be the first set of attributes. In another example, the second set of attributes may be a subset of the first set of attributes.

The first database and second database may initially comprise a same content. After that, the content may change at the first database. The change of the first database may cause the modification of an existing one or more data records of the first database and/or insertion of one or more new data records in the first database. The modification of an existing data record may comprise deletion of the data record or update of at least one attribute of the data record. The present subject matter may enable an efficient synchronization of the first database with the second database. The synchronization according to the present subject matter may cause a set of data to remain identical, in the first database and second database, within typical tolerances that are acceptable for database access. The synchronization may be enabled by performing a conditional replication of changes that affect the attributes which are present in the first database and the second database. The replication may be performed by applying the same change of the first database on the second database. For that, the present method may perform the replication method. The replication method checks whether the change of the first database affects one or more attributes of the first type $X_1 \ldots X_K$. If so, the replication method may further check whether the values of the said one or more attributes fulfill the tolerance range. The replication of the change may only be performed if the tolerance is not fulfilled.

The present subject matter may deviate from the basic rule of traditional data replication concepts ("everything must be replicated") and instead propose to sample data and only replicate changes for which appropriate criteria apply. In other words, provided that specific criteria on data changes are obeyed, with the present subject matter not all data changes may need to be replicated to the target location anymore. The present approach may especially be suited for replication systems which must deal with "sensor" data streamed from the internet, because a high income-rate of values which differ only little is stored. Nevertheless, the present approach can also be used with traditional data which is created and changed based on "internal" processes (as opposed to streaming data from the internet) where similar high frequent changes occur.

The replication method according to the present subject matter may further take into account the changes that involve the attributes of the second type. The changes affecting the second type attributes may be unconditionally replicated to the second database. According to one embodiment, the replication method further comprises in response to detecting a change of an attribute which is not part of the subset of attributes of the first type $X_1 \ldots X_K$, replicating the change to the second database. This embodiment may enable a seamless integration of the present subject matter in databases that comprise streaming data as well as non-streaming data.

As described above, the change of the first database may involve a subset of one or more attributes $X_1 \ldots X_n$ of the first type, where $n \geq 1$ and $n \leq K$. In particular n values $v_1 \ldots v_n$ of this subset of attributes $X_1 \ldots X_n$ may be provided by the change. The subset of attributes may, for example, represent the temperature and humidity whose values are provided by a sensor. In another example, the subset of attributes may represent only one property such as the pressure whose values are provided by a sensor. These n values may be checked against the tolerance range in the tolerance check step.

The tolerance range may, for example, include an enumeration, discrete range, or continuous range. The tolerance range according to the present subject matter may be provided in different ways each having its own advantage. The tolerance range may be derived from the values of the subset of attributes $X_1 \ldots X_n$ themselves, or from a user defined function that uses as arguments the subset of attributes $X_1 \ldots X_n$. In another example, the tolerance range may be provided as a time interval or a range of change orders that the received change should fulfil. This last example may enable a random sampling e.g., the tolerance range may indicate every m-th data change order, $m=2, 3 \ldots$ so that the order of the received change may be checked against it.

In one example, a same tolerance range may be derived for the subset of one or more attributes $X_1 \ldots X_n$. That is, all n values $v_1 \ldots v_n$ of the subset of attributes $X_1 \ldots X_n$ may be checked against the same tolerance range. The current values $v_1 \ldots v_n$ of the subset of attributes $X_1 \ldots X_n$ which are received in the change may be referred to as $v_i^{t+1}, \ldots v_n^{t+1}$ respectively, where t+1 is an index referring to the current processed/detected change. The tolerance range may be provided as a percentage or normalized values that can be used for different attributes. This may particularly be advantageous in case the number of attributes n is higher than one. It may enable a uniform check of the attributes. Thus, according to one embodiment, upon detecting the change, determining for each attribute $X_i$ of the subset of attributes $X_1 \ldots X_n$ an upper limit and a lower limit of an individual tolerance range $tr_i$ using respectively a maximum value and minimum value of a last N values of the attribute $X_i$ respectively, where $N>1$ and i varies between 1 and n. For example, the tolerance range $tr_i$ may be determined for the attribute $X_i$ as follows. The maximum value may be defined as $\max(v_i^t, v_i^{t-1}, \ldots, v_i^{t-N-1})$ and the minimum value may be defined as $\min(v_i^t, v_i^{t-1}, \ldots, v_i^{t-N-1})$, where $v_i^t, v_i^{t-1}, \ldots, v_i^{t-N-1}$ are the last N values of the attribute $X_i$. The upper limit of the tolerance range $tr_i$ may be defined as the ratio:

$$\frac{\max(v_i^t, v_i^{t-1}, \ldots, v_i^{t-N-1})}{\max(v_i^t, v_i^{t-1}, \ldots, v_i^{t-N-1}) + \min(v_i^t, v_i^{t-1}, \ldots, v_i^{t-N-1})}$$

and the lower limit of the tolerance range $tr_i$ may be defined as the ratio:

$$\frac{\max(v_i^t, v_i^{t-1}, \ldots, v_i^{t-N-1})}{\max(v_i^t, v_i^{t-1}, \ldots, v_i^{t-N-1}) + \min(v_i^t, v_i^{t-1}, \ldots, v_i^{t-N-1})}.$$

This may result in n tolerance ranges $tr_1 \ldots tr_n$ associated with the subset of attributes $X_1 \ldots X_n$ respectively. For example, one of these tolerance ranges may be selected and used for performing the tolerance check step. In another example, the tolerance ranges may be combined (e.g., averaged) to obtain one tolerance range.

In another example, the tolerance range may be specific to each attribute of the subset of one or more attributes $X_1 \ldots X_n$. That is, each value of the n values $v_1 \ldots v_n$ of the subset of attributes $X_1 \ldots X_n$ may be checked against the respective tolerance range. This may be advantageous as it may optimize the replication method on individual attribute basis. The current values of the subset of attributes $X_1 \ldots X_n$ which are received in the change may be referred to as $v_i^{t+1}, \ldots v_n^{t+1}$ where t+1 is an index referring to the current processed/detected change. Thus, according to one embodiment, upon detecting the change, determining for each attribute $X_i$ of the subset of attributes $X_1 \ldots X_n$ an upper limit and a lower limit of the tolerance range using respectively a maximum value and minimum value of a last N values of the attribute $X_i$, where $N>1$. For example, the tolerance range may be determined for the attribute $X_i$ as follows. The upper limit of the tolerance range may be $\max(v_i^t, v_i^{t-1}, \ldots, v_i^{t-N-1})$ and lower limit of the tolerance range may be $\min(v_i^t, v_i^{t-1}, \ldots, v_i^{t-N-1})$, where $v_i^t, v_i^{t-1}, \ldots, v_i^{t-N-1}$ are the last N values of the attribute $X_i$. This may result in n tolerance ranges $tr_1 \ldots tr_n$.

The above two examples may enable a dynamic determination of the tolerance range. A storage may be provided so that the last N values of each attribute $X_i$ of the subset of attributes $X_1 \ldots X_n$ may be stored therein. Since the storage may be limited, the present subject matter may advantageously manage it as follows. After executing the replication method on the currently detected change, the current values $v_i^{t+1}, \ldots v_n^{t+1}$ may be stored in the storage and the oldest values $v_i^{t-N-1}, \ldots, v_n^{t-N-1}$ may be deleted. And the tolerance range may be computed again as described above so that it can be used for a next change t+2.

Depending on how the tolerance range is defined, the present subject matter may provide different implementation methods of the tolerance check step.

According to one embodiment, the determining whether the change fulfils the defined tolerance range comprises: determining whether each of the n values $v_1 \ldots v_n$ is within the defined tolerance range. For example, it may be checked whether each value $v_i$ is smaller than the tolerance range, where i varies between 1 and n.

According to another embodiment, the determining whether the change fulfils the defined tolerance range comprises: determining whether a value of a user defined function of the n values $v_1 \ldots v_n$ is within the defined tolerance range. For example, it may be checked whether a value of the function $f(v_1 \ldots v_n)$ is smaller than the tolerance range. The subset of attributes may, for example, represent the temperature $v_1$ and latitude $v_2$ of an environment/object (i.e., n=2) whose values are provided by a sensor. The function may, for example, be the ratio of the temperature and the latitude.

According to one embodiment, the determining whether the change fulfils the defined tolerance range comprises: determining whether a difference between the received value $v_i^{t+1}$ and the last value $v_i^t$ of the specific attribute $X_i$ is within the tolerance range, where i varies between 1 and n. For example, it may be checked whether the difference $|v_i^{t+1} - v_i^t|$ or relative difference $$\frac{|v_i^{t+1} - v_i^t|}{v_i^{t+1}}$$

is smaller than the tolerance range.

When used in combination with supervision of critical system parameters, such as system load and latency, the replication method may be used to keep the overall system load and latency of replicated data under control. In some cases even the blocking of queries from execution (because of a too high data latency) could be avoided. The replication method may advantageously be performed in case the system performance is not optimal. In other words, if the system performance is optimal, every change to the first database may be replicated to the second database (e.g., because there are enough resources to execute the unconditional replication). Thus, according to one embodiment, the method further comprises: determining whether a performance parameter of the first and second database exceeds a threshold, and in response to determining that the performance parameter exceeds the threshold activating a conditional replication function, thereby performing the replication method.

According to one embodiment, the method further comprises deactivating the conditional replication function in response to determining that the performance parameter does not exceed the threshold and performing a default replication method. The default replication method comprises: in response to detecting a change of an attribute of the set of attributes, replicating the change to the second database. That is, the default replication method performs an unconditional replication of every change of the first database to the second database.

According to one embodiment, the performance parameter is at least one of: system load and system latency.

The present subject matter may seamlessly be integrated in existing database systems. In particular, the existing database system may provide logging techniques for saving log records. The following embodiments may make use of that logging techniques to implement the replication method according to the present subject matter. According to one embodiment, the method comprises a logging method. The logging method comprises for each received change: determining whether the change involves one or more attributes of the subset of attributes; in response to determining that the change involves one or more attributes of the subset of attributes, adding a log entry indicating the change and log metadata of first type; in response to determining that the change does not involve one or more attributes of the subset of attributes, adding a log entry indicating the change and log metadata of second type; wherein the replication method further comprises: sequentially reading each log entry of a current non-read set of log entries, wherein detecting the change indicating the value of the at least one selected attribute of the set of attributes comprises determining that the log metadata of the log entry is of the first type. According to one embodiment, the logging method and the replication method being asynchronously executed. According to one embodiment, the method further comprises determining a latency based on the current log entry and the last log entry of the set of log entries; performing the replication method in case the latency does not exceed a threshold.

FIG. 1 is a block diagram for a computer system 100 suited in accordance with an example of the present subject matter. The computer system 100 may, for example, comprise IBM Db2 Analytics Accelerator for z/OS (IDAA). The computer system 100 comprises a source database system 101 connected to a target database system 121. The source database system 101 may, for example, comprise IBM Db2 for z/OS. The target database system 121 may, for example, comprise IBM Db2 Warehouse (Db2 LUW).

Source database system 101 includes processor 102, memory 103, I/O circuitry 104, and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives, and floppy disks drives. Sample media include hard disk platters, CD-ROMs, DVD-ROMs, BD-ROMs, floppy disks, and the like. The storage 107 may comprise a first database 112. The first database 112 may, for example, comprise one or more first tables 190. The one or more first tables 190 may comprise a set of attributes (columns) $X_1, \ldots X_K$ of the first type, where K≥1 and optionally attributes $Y_1, \ldots Y_M$ of the second type, where M≥0.

Memory 103 may include one or more separate programs (e.g., database management system DBMS1 109), each of which comprises an ordered listing of executable instructions for implementing logical functions, notably functions involved in embodiments of this disclosure. The software in memory 103 shall also typically include a suitable operating system (OS) 108. The OS 108 essentially controls the execution of other computer programs for implementing at least part of methods as described herein. DBMS1 109 comprises a replication system 111 and a query optimizer 110. The replication system 111 may comprise a log reader (not shown). The log reader may read log records (also referred to as log entries) of a transaction recovery log 115 of the source database system 101 and provide changed records to the target database system 121. The usual content of a log record may comprise a timestamp, log record sequence number (LRSN), and attribute changes. More specifically, the log records in the transaction recovery log 115 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, log records for inserted rows may contain only new column values while transaction log records for deleted rows may contain only old column values. Log records for updated rows may contain the new and old values of all row columns. The order of log records in the transaction recovery log may reflect the order of change operations of the transactions and the order of transaction commit records may reflect the order in which transactions are completed. The type of row operations in log records can, for example, be delete, insert, or update. The log reader may read log records from the recovery log, extract relevant modification, or change information (inserts/updates/deletes targeting tables in replication). Extracted information may be transmitted (e.g., as a request for application of the change) to target database system 121. The query optimizer 110 may be configured for generating or defining query plans for executing queries (e.g., on first database 112).

Target database system 121 includes processor 122, memory 123, I/O circuitry 124, and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM)). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives, and floppy disks drives. Sample media include hard disk platters, CD-ROMs, DVD-ROMs, BD-ROMs, floppy disks, and the like.

Memory 123 may include one or more separate programs (e.g., database management system DBMS2 129 and apply component 155), each of which comprises an ordered listing of executable instructions for implementing logical functions, notably functions involved in embodiments of this disclosure. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries (e.g., on a second database 132). The apply component 155 may buffer log records sent from the log reader and consolidate the changes into batches to improve efficiency when applying the modifications to the second database 132 via a bulk-load interface. This may enable performance of the replication.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1 as separate systems, the source and target database systems may belong to a single system (e.g., sharing a same memory and processor hardware), while each of the source and target database systems is associated with a respective DBMS and datasets (e.g., the two DBMS s may be stored in the shared memory). In another example, the two database management systems DBMS1 and DBMS2 may form part of a single DBMS that enables communications and method performed by DBMS1 and DBMS2 as described herein. The first and second datasets may be stored on a same storage or on separate storages.

Figure 2:
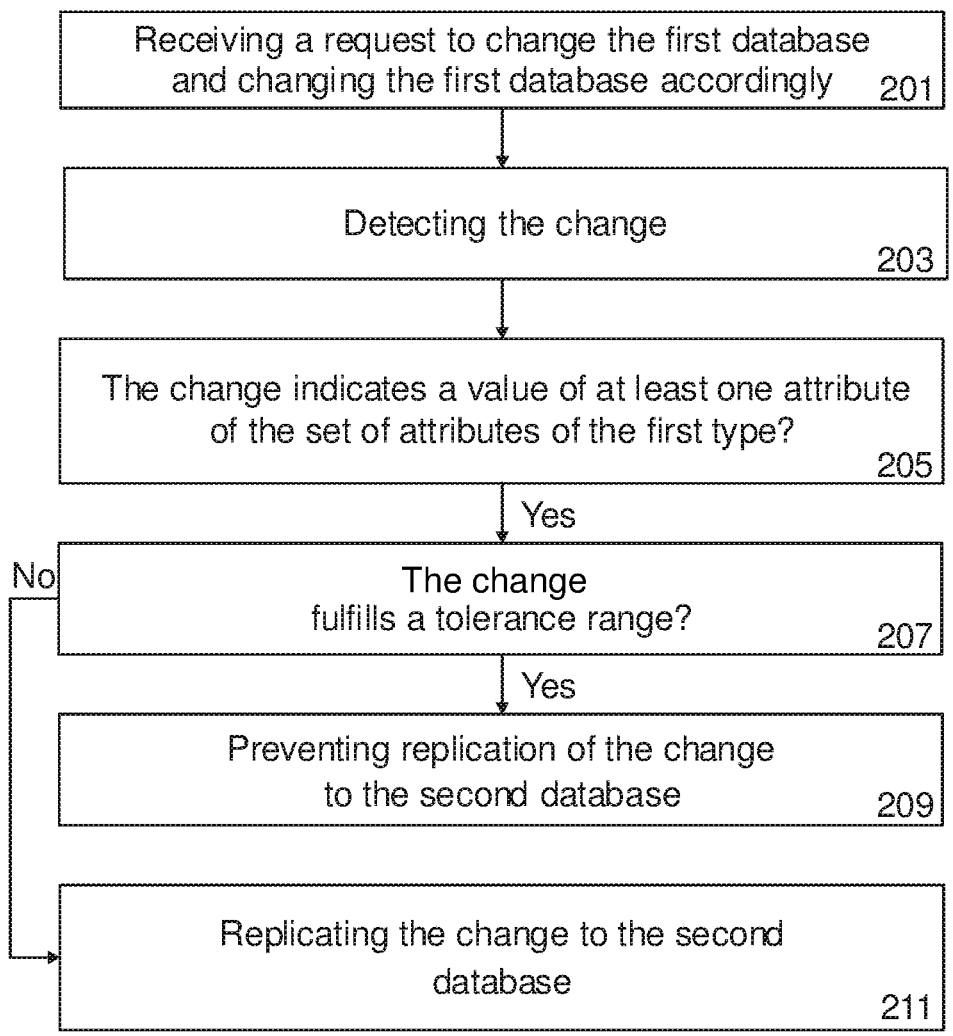
FIG. 2 is a flowchart of a method for synchronizing a first database with a second database in accordance with an example of the present subject matter.

FIG. 2 is a flowchart of a replication method in accordance with an example of the present subject matter. For the purpose of explanation, the method described in FIG. 2 may be implemented in the system illustrated in FIG. 1, but is not limited to this implementation. The method of FIG. 2 may, for example, be performed by the computer system 100.

The source database system 101 may receive a request to change the first database 112 in step 201. The requested change may be an update of one or more existing records of the first database. The first database 112 may be changed according to the requested change. Upon implementing the requested change, one or more log records may be stored in the transaction log 115.

The change may be detected in step 203. The change may, for example, be detected by the replication system 111. The replication system 111 may, for example, identify a new log record in the transaction log that represents the change. In another example, the replication system 111 may determine that the size of the first database 112 has changed which is an indication of the change.

It may be determined in step 205 whether the change indicates a value of at least one attribute of the set of attributes of the first type. That is, it may be determined whether the change involves one or more attributes of the attributes of first type $X_1 \ldots X_K$. This may, for example, be performed by parsing the log record(s) and identifying attribute names that would correspond to the first type attributes. Assuming, for example, that the change involves the subset of attributes $X_1 \ldots X_n$ where n≥1. The change may indicate the values $v_1 \ldots v_n$ of these n attributes $X_1 \ldots X_n$ respectively i.e., the change indicates that $X_1 = v_1 \ldots X_n = v_n$. These values may be referred to as current values $v_1^{t+1} \ldots v_n^{t+1}$ which may replace existing values $v_1^t \ldots v_n^t$ respectively in case of an update.

Step 205 may optionally be performed. For example, in case the first database comprises only attributes of the first type, step 205 may not be needed. However, it may be advantageous to execute step 205 even if the current content of the first database has only the first type attributes. This is because the first database may change over time and thus include further attributes. In addition, the definition of the first type attributes may change over time e.g., the attribute that is considered currently as being of the first type may not be of that first type in the future if, for example, the data source that provides the values of said attribute does not stream them anymore and only send them in less frequent manner.

In case the change indicates a value of at least one attribute of the set of attributes of the first type, it may be determined in step 207 whether the change fulfills a defined tolerance range. For example, it may be determined in step 207 whether the one or more values $v_1^{t+1} \ldots v_n^{t+1}$ fulfill the defined tolerance range. In another example, it may be determined whether the order of the change is equal to one of the orders indicated in the tolerance range e.g., if the received change is the $l^{th}$ change it may be determined whether the order l is part of the tolerance range. Step 207 may be referred to as the tolerance check step.

In one first example implementation of step 207, the differences $|v_1^{t+1} - v_1^t| \ldots |v_n^{t+1} - v_n^t|$ between the current values and the last values of the attributes $X_1 \ldots X_n$ may be computed and then compared against the tolerance range tr. For example, the following n (n≥1) comparisons:

$$\frac{|v_i^{t+1} - v_i^t|}{v_i^{t+1}} < tr \ldots \text{ and } \frac{|v_n^{t+1} - v_n^t|}{v_n^{t+1}} < tr$$

may be performed in step 207.

In one second example implementation of step 207, functions $f_1 \ldots f_n$ of the attributes $X_1 \ldots X_n$ may be evaluated using the current values $v_1^{t+1} \ldots v_n^{t+1}$ and the last values $v_1^t \ldots v_n^t$. The functions may, for example, be a query analysis function that are usually performed on the first and/or second database. In this case, the following n comparisons $|f_1(v_1^{t+1}) - f_1(v_1^t)| < tr \ldots$ and $|f_n(v_n^{t+1}) - f_n(v_n^t)| < tr$ may be performed in step 207.

In one third example implementation of step 207, a global function $f$ of the attributes $X_1 \ldots X_n$ may be evaluated using the current values $v_1^{t+1} \ldots v_n^{t+1}$ and the last values $v_1^t \ldots v_n^t$. The function $f$ may, for example, be a query analysis function that is usually performed on the first and/or second database. The following comparison $|f(v_1^{t+1} \ldots v_n^{t+1}) - f(v_1^t \ldots v_n^t)| < tr$ may be performed in step 207.

The tolerance range may be provided depending on the type of implementation of step 207. In another example, a same normalized tolerance range may be provided regardless of the implementation method of step 207 based on the values $v_1^{t+1} \ldots v_n^{t+1}$. In this case, a normalization may be performed before comparisons are performed with the tolerance range.

In response to determining that the change fulfills the defined tolerance range e.g., that the one or more values $v_1 \ldots v_n$ fulfill the defined tolerance range, the replication of the change to the second database may be prevented (209). Otherwise, the change may be replicated in step 211 to the second database 132. In case all the comparisons performed in step 207 are successful, then the change would not be replicated to the second database. This is because the changes to the attributes $X_1 \ldots X_n$ are not significant.

Figure 3:
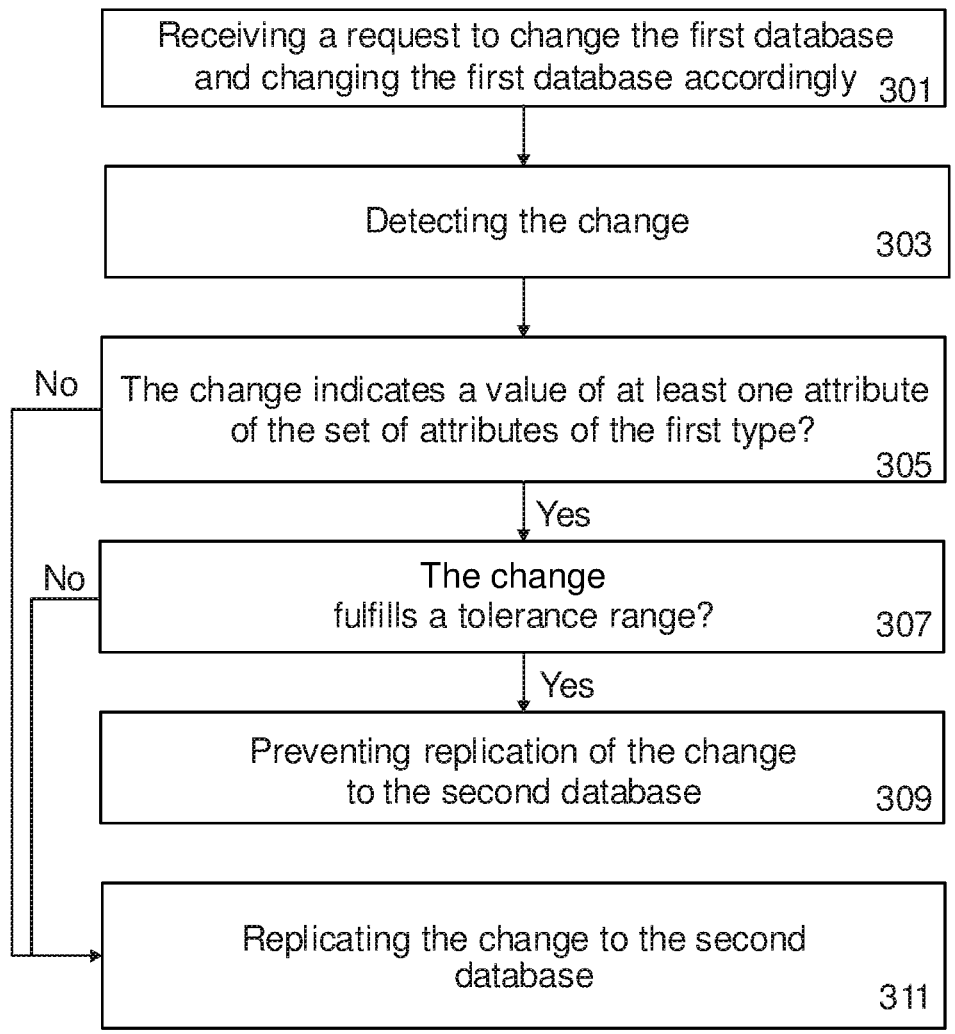
FIG. 3 is a flowchart of a method for synchronizing a first database with a second database in accordance with an example of the present subject matter.

FIG. 3 is a flowchart of a replication method in accordance with an example of the present subject matter. For the purpose of explanation, the method described in FIG. 3 may be implemented in the system illustrated in FIG. 1, but is not limited to this implementation. The method of FIG. 3 may, for example, be performed by the computer system 100.

Steps 301 to 311 of Figure are steps 201 to 211 of FIG. 2 respectively. In addition, FIG. 3 further comprises in step 305: in response to determining (305) that the change does not indicate any of the attributes of the first type, the change may be replicated in step 311 to the second database.

Figure 4:
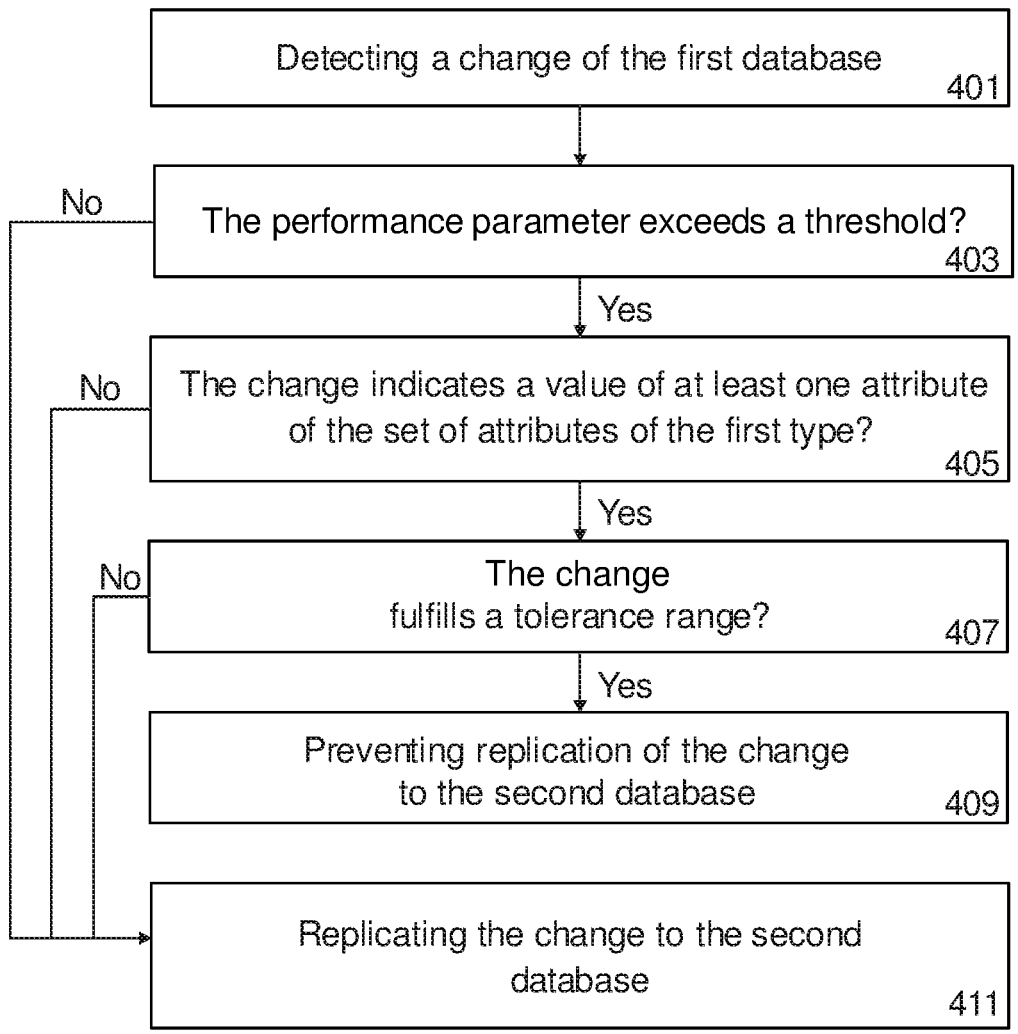
FIG. 4 is a flowchart of a method for synchronizing a first database with a second database in accordance with an example of the present subject matter.

FIG. 4 is a flowchart of a replication method in accordance with an example of the present subject matter. For the purpose of explanation, the method described in FIG. 4 may be implemented in the system illustrated in FIG. 1, but is not limited to this implementation. The method of FIG. 4 may, for example, be performed by the computer system 100.

A change may be detected in step 401 in the first database. It may be determined in step 403 whether a performance parameter of the computer system exceeds a threshold. The performance parameter of the computer system 100 may, for example, be evaluated in step 403 or may be pre-computed by the computer system.

In case the performance parameter exceeds a threshold, steps 405 to 411 may be executed, wherein steps 405 to 411 are steps 305 to 311 of FIG. 3 respectively. That is, the replication method of FIG. 3 is performed for the detected change in case the performance parameter exceeds the threshold. In case the performance parameter does not exceed the threshold, the change may be replicated to the second database in step 411.

Figure 5A:
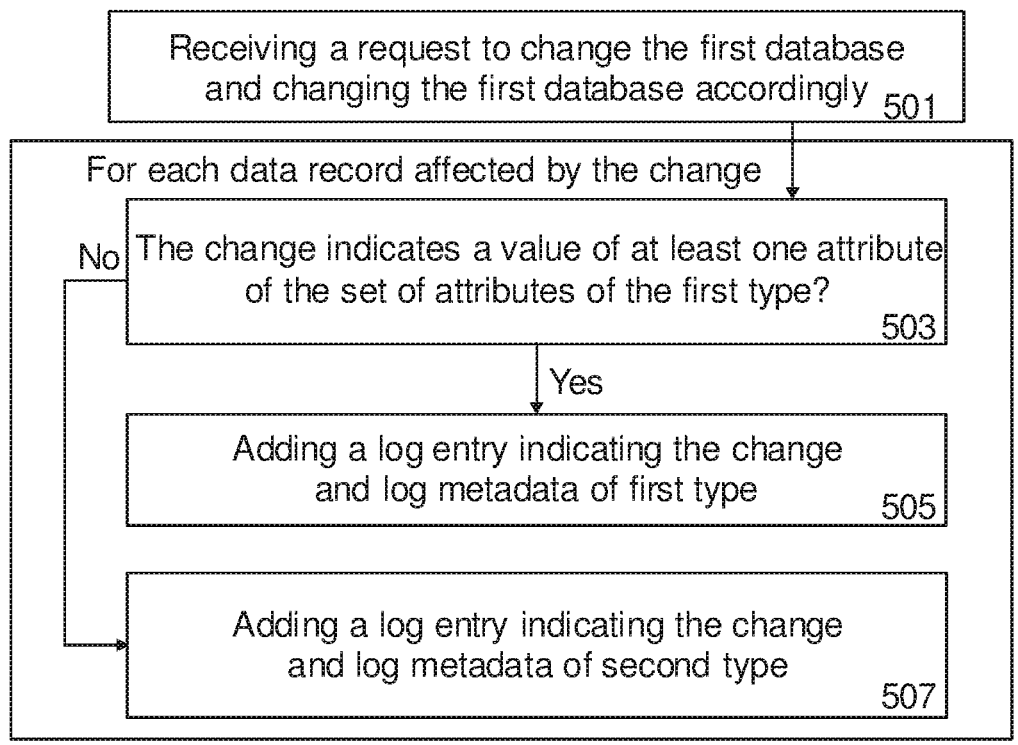
FIG. 5A is a flowchart of a method for determining whether a change fulfills a tolerance range in accordance with an example of the present subject matter.

FIG. 5A is a flowchart of a logging method in accordance with an example of the present subject matter. For the purpose of explanation, the method described in FIG. 5A may be implemented in the system illustrated in FIG. 1, but is not limited to this implementation. The method of FIG. 5A may, for example, be performed by the computer system 100.

The source database system 101 may receive a request to change the first database 112 in step 501. The requested change may be an update of one or more existing data records of the first database. The first database 112 may be changed according to the requested change.

For each data record of the data records that are affected by the change, steps 503 to 507 may be performed. It may be determined in step 503 whether the change of the current data record indicates a value of at least one attribute of the set of attributes of the first type.

Figure 5B:
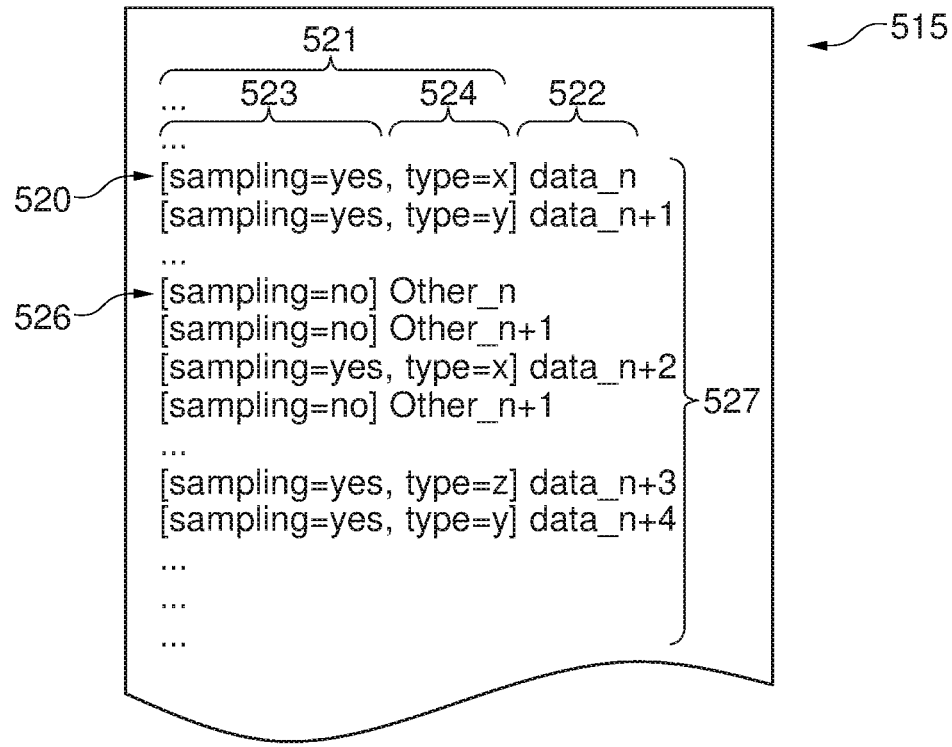
FIG. 5B illustrates a portion of a transaction log in accordance with an example of the present subject matter.

In case the change of the current data record indicates a value of at least one attribute of the set of attributes of the first type, a log entry may be added in step 505 to the transaction log indicating the change and having log metadata of first type. This is illustrated in FIG. 5B. FIG. 5B shows a portion 515 of the transaction log. The log entry 520 may correspond to the log entry added in step 505. The log entry 520 comprises one metadata component 521 and one component 522 that comprises the usual content of a log entry as described in FIG. 1. The metadata component 521 comprises values of two parameters. A first parameter 523 named "sampling" indicates (e.g., by "sampling=yes") that the present change involves an attribute of the first type and a second parameter 524 indicates one of the implementation methods of the tolerance check step 207 as described herein.

In case the change of the current data record does not indicate a value of any attribute of the set of attributes of the first type, a log entry may be added in step 507 to the transaction log indicating the change and having log metadata of second type. This is illustrated in FIG. 5B. The log entry 526 may correspond to the log entry added in step 507. The metadata component of the log entry 526 comprises only the value of the first parameter indicating (e.g., by "sampling=no") that the attribute is not of the first type.

The term "sampling" means dropping and ignoring some changes of data, and replicating only a fraction of the changes to the second database. If, for example, the attribute values result from high frequent changes of sensor data, which in most cases only differ marginally (such as caused by noise effects, or only little changes spread over long periods of time), the loss of information due to sampling is rather small, and replication of all marginal changes may be a waste of system resources. The replication method may thus also be referred to as sampling method.

The method of FIG. 5A may be repeated for each requested change of the first database. This may result in a set of log entries 527 in the transaction log.

Figure 6:
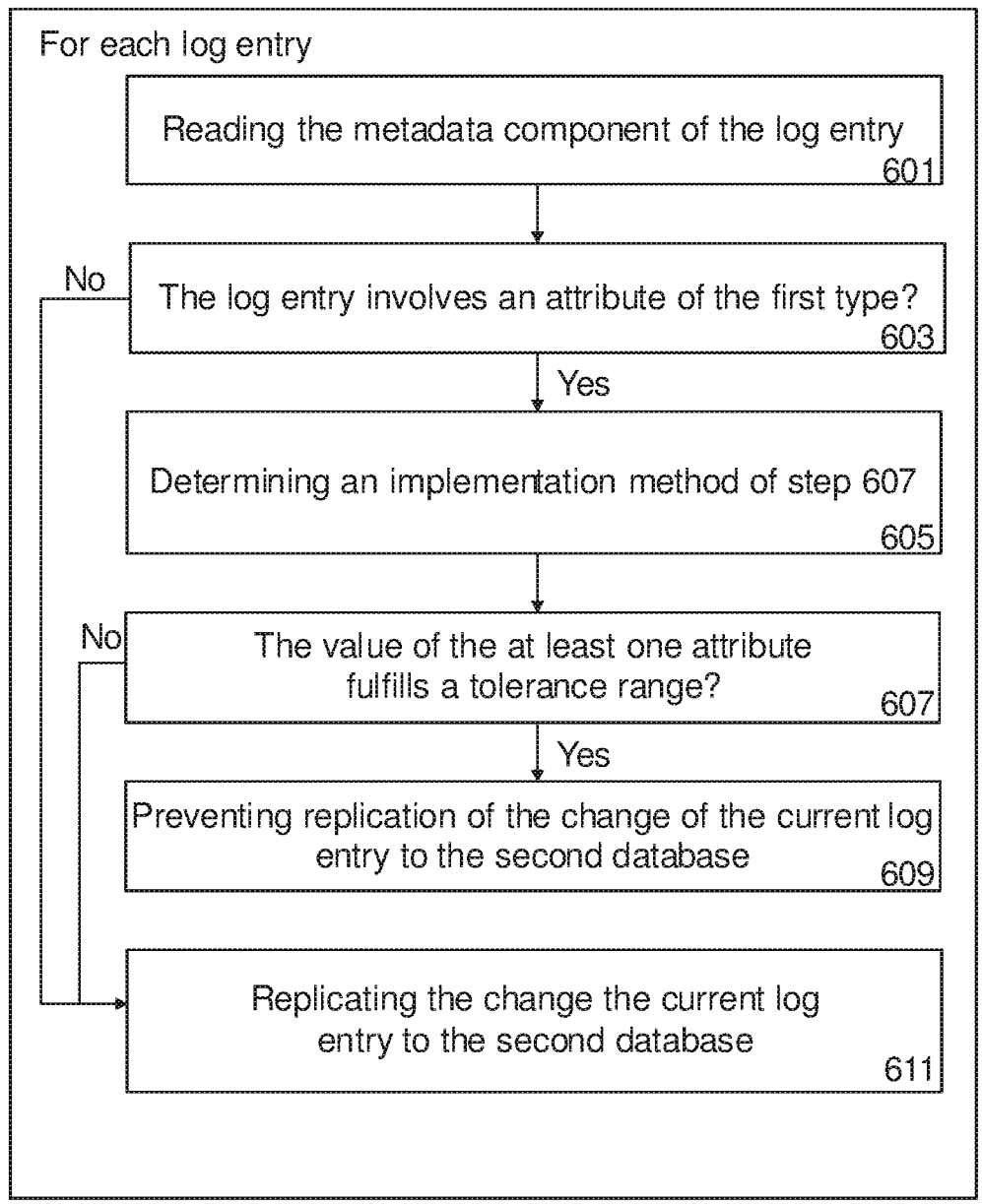
FIG. 6 is a flowchart of a logging method in accordance with an example of the present subject matter.

FIG. 6 is a flowchart of a replication method in accordance with an example of the present subject matter. For the purpose of explanation, the method described in FIG. 6 may be implemented in the system illustrated in FIG. 1, but is not limited to this implementation. The method of FIG. 6 may, for example, be performed by the computer system 100.

The set of log entries of the transaction log which are not yet processed or read may be processed by the replication method sequentially. For example, the set of log entries 527 of FIG. 5B may be unread log entries. For each log entry of the set of log entries, steps 601 to 611 may be performed.

In step 601, the metadata component 521 of the log entry e.g., 520 may be read in order to read the value of the sampling parameter.

In case (603) the value of the sampling parameter is "yes", meaning that the log entry involves an attribute of the first type, the value of the second parameter may be used to determine in step 605 which implementation method of the tolerance check step may be used for next step 605. In step 607, it may be checked whether the one or more values of the one or more attributes of the first type of this log entry fulfill the defined tolerance range. This check may be performed according the implementation method indicated by the second parameter 524. In response to determining that the one or more values fulfill the defined tolerance range, the replication of the change of the current log entry to the second database may be prevented (609). Otherwise, the change may be replicated in step 611 to the second database.

In case (603) the value of the sampling parameter is "no", meaning that the log entry involves no attribute of the first type, the change may be replicated in step 609 to the second database.

Figure 7A:
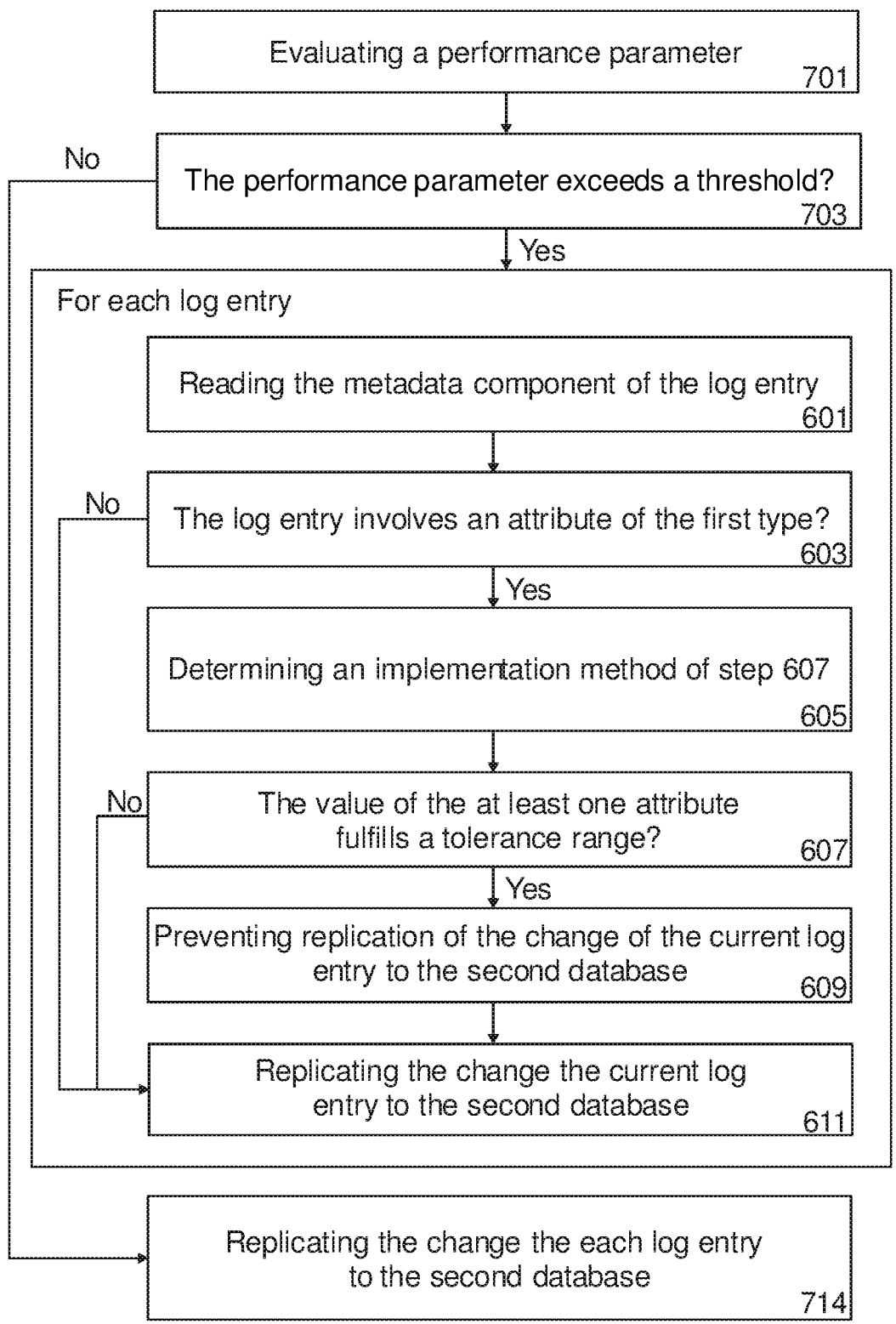
FIG. 7A is a flowchart of a method for synchronizing a first database with a second database in accordance with an example of the present subject matter.

FIG. 7A is a flowchart of a replication method in accordance with an example of the present subject matter. For the purpose of explanation, the method described in FIG. 7A may be implemented in the system illustrated in FIG. 1, but is not limited to this implementation. The method of FIG. 7A may, for example, be performed by the computer system 100.

The set of log entries of the transaction log which are not yet processed or read may be processed by the replication method sequentially. For example, the set of log entries 727 of the transaction log 715 of FIG. 7B may be unread log entries.

A performance parameter of the computer system 100 may be evaluated in step 701 using the set of log entries 727. For example, the latency may be evaluated based on the current log reader position 720 and the current log head position 730 as shown in FIG. 7B.

It may be determined (step 703) whether the evaluated performance parameter exceeds a threshold. In case the evaluated performance parameter exceeds the threshold steps 601 to 611 may be performed as described in FIG. 6 for each log entry of the set of log entries. In case the evaluated performance parameter does not exceed the threshold, the change associated with each log entry of the set of log entries 727 may be replicated in step 714 to the second database.

Figure 7B:
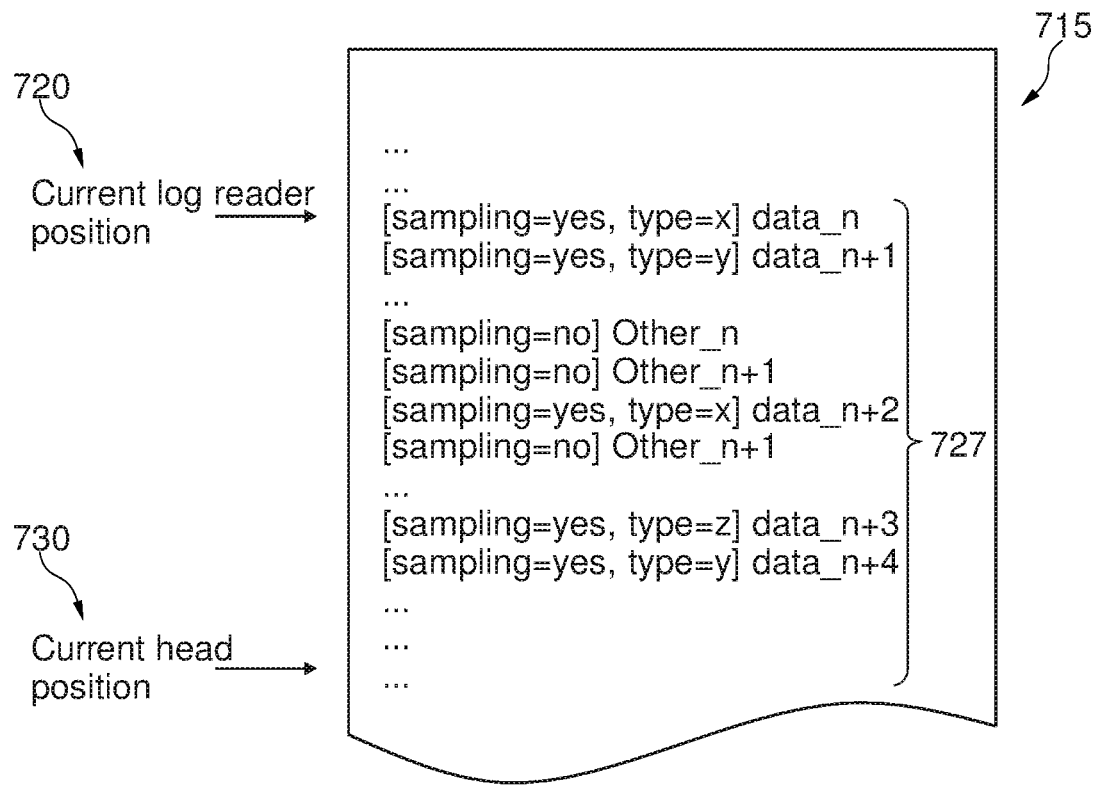
FIG. 7B illustrates a portion of a transaction log in accordance with an example of the present subject matter.

FIG. 7B shows an example of a modified list of log events which specify whether a piece of data which was just updated in the first database may be sampled or not. In the latter case there is no change from the traditional way, in that each change may be replicated to the second database. In the first case; however, if the data which was updated may be sampled, then the log entry will contain additional metadata to specify which sampling method and correlated sampling criteria may be used. After evaluation of this additional information, the decision is done by the replication system what to do in detail with the data, e.g., to replicate in the traditional way without any condition, or to sample the data item according to data-type specific sampling rules.

Figure 8:
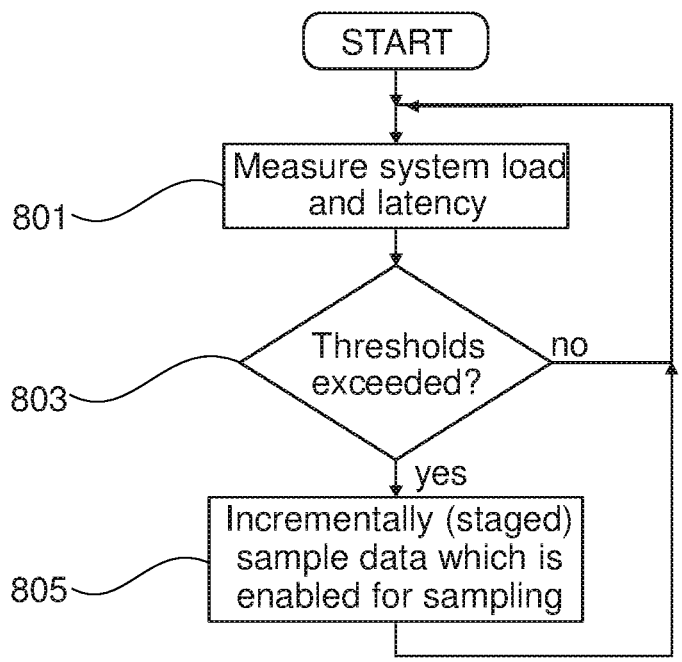
FIG. 8 is a flowchart of a sampling method in accordance with an example of the present subject matter.

FIG. 8 is a flowchart of a sampling method in accordance with an example of the present subject matter. FIG. 8 depicts the logic based on which the sampling method is activated, and to which extend. A desired and pre-configured threshold for maximum system load and latency of replicated data may continuously be measured in step 801. As soon as (inquiry step 803) thresholds are exceeded, sampling of replicated data is activated in step 805 (optionally in stages, i.e., not going to the limits immediately), until system load and data latency are in the desired range again.

The sampling method of FIG. 8 may, for example, be a random sampling approach for data replication. For example, if detailed information about specific data changes over time is missing, random sampling may be used for a particular attribute. One could choose to only take every m-th data change (m=2, 3, 4, 5, . . . ) and replicate it to the second database, while all other data changes are ignored for replication. In a scenario where the overall system load and latency exceeds the preconfigured thresholds a low value of m could be started with, and only increased in moderate steps as long as the system load and latency parameters are not back to normal. FIG. 8 shows this basic approach with random sampling, which would be engaged temporarily only to save the system from peaks of high load and latency.

Figure 9A:
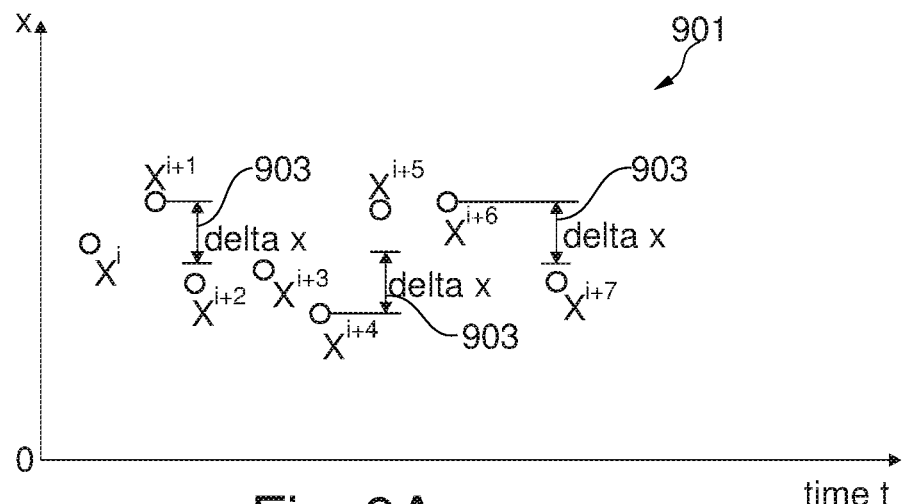
FIG. 9A is a diagram illustrating a method for determining a tolerance range in accordance with an example of the present subject matter.
Figure 9B:
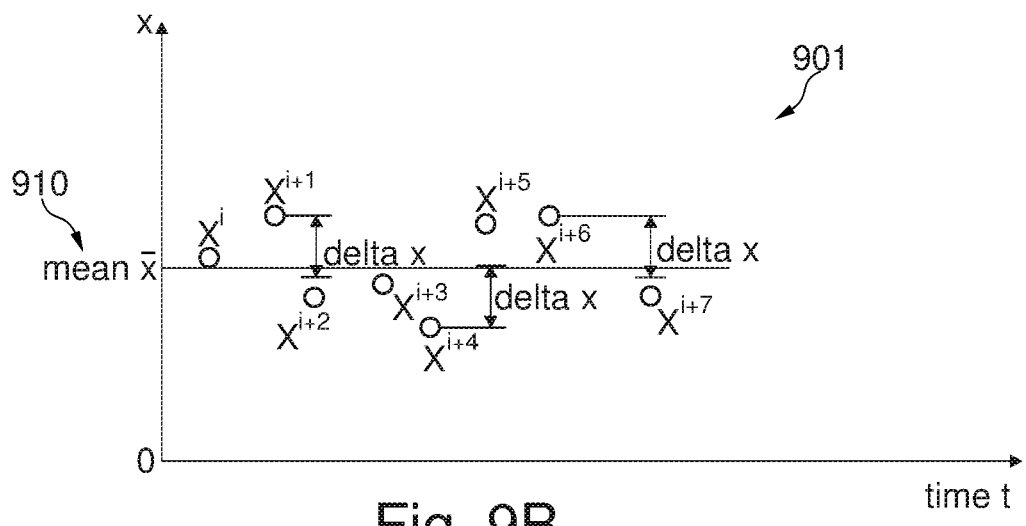
FIG. 9B is a diagram illustrating a method for determining a tolerance range in accordance with an example of the present subject matter.

The method of FIG. 8 may be advantageous in case of a temporal activation of sampling. However, in case a permanent activation of sampling is required, then a sophisticated sampling approach may be used to (first) keep the loss of information under control, and to (second) avoid unnecessary replication of data. For this, each change of data may be examined at the source location of the first database and a strategy do decide about data replication may be used. In the simplest way, a new data value of an attribute at the first database is compared with the previous data value of that attribute. Even in this simple approach, a data history of "1" already may be needed, e.g., a mechanism may be established to store the data changes locally at the source location with a history depth of 1. In general, storing data values locally to build a history of otherwise volatile information may be called "Reservoir Sampling". Thus, with a history depth of 1 the decision to replicate a new data value could be done based on the difference of the new data value compared to the previous one. Assuming, for example, a data stream from an internet of things (IOT) sensor which arrives at the first database and a decision may be made which changes to be replicated to the second database. A typical diagram 901 of such data changes over time is shown in FIG. 9A. Each new value of the attribute X is compared with the previous one and decision to replicate is done when the difference exceeds a preconfigured difference "delta x" 903. FIG. 9A shows that based on this strategy, several replication operations will occur at the specific time-points of values $X^{i+2}$, $X^{i+5}$, and $X^{i+7}$. However, if a deeper history of data points is used, several replications could be avoided without loss of significant information, since the data values are just oscillating around a mean value $\overline{X}$ of changes in the past. A solution to this is shown in FIG. 9B. A sampling strategy according to FIG. 9B may be as follows: Let $X^i$ be the data point values of an attribute X over time ($X^i$, $X^{i+1}$, . . . ), and N be the amount of data points considered (data history), then the mean value $\overline{X}$ 910 may be calculated as follows:

$$\overline{X} = \frac{1}{N}\sum_{i=1}^{N} X^i.$$

Figure 9C:
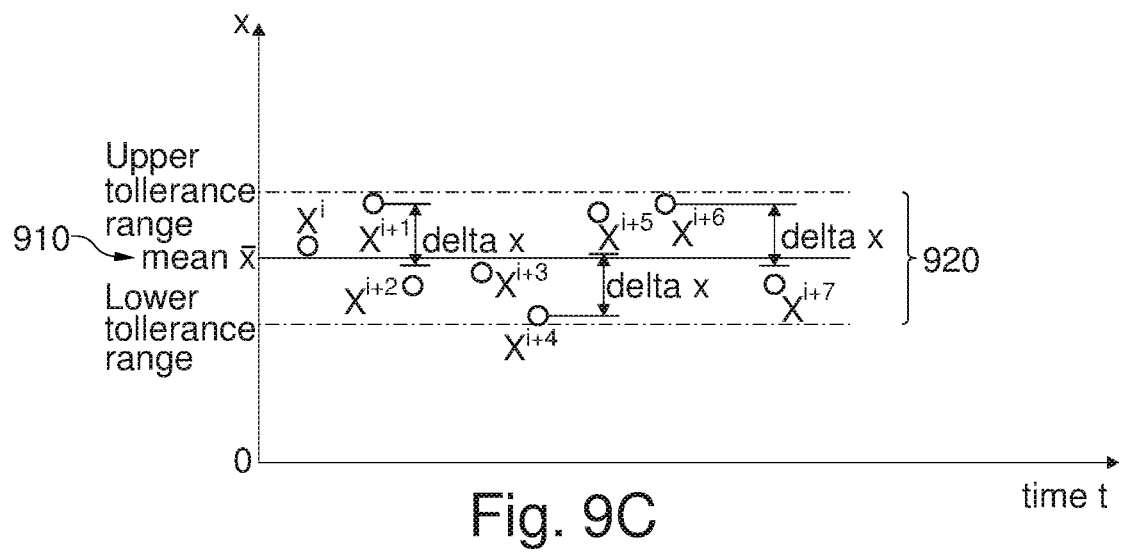
FIG. 9C is a diagram illustrating a method for determining a tolerance range in accordance with an example of the present subject matter.

Based on the mean value $\overline{X}$ 910, an upper and/or lower range could be calculated which serves as a "tolerance range" for this attribute X. Only if a new data value, which arrives at the first database, exceeds the tolerance range, then replication to the second database may occur. FIG. 9C depicts a tolerance range 920 around a mean value 910 calculated from the history of previous data points. Only if this tolerance range 920 is exceeded, a replication of data will occur. A common terminology and approach used for characterizing samples drawn from a bigger set of original information comprises "variance", "standard deviation" and "standard error". Thus, as another example, the criteria could be that new data values are not replicated as long as a predefined "standard error" is not exceeded, based on a sample size of N. That is the tolerance range may be one of "variance", "standard deviation" and "standard error". The standard deviation σ may be defined as:

$$\sigma = \sqrt{\frac{1}{N-1}\sum_{i=1}^{N}\left(X^i - \overline{X}\right)^2}.$$

The variance may be equal to $\sigma^2$ and the standard error $\sigma_{\overline{X}}$ may be defined as $$\sigma_{\overline{X}} = \frac{\sigma}{\sqrt{N}}.$$

Figure 10:
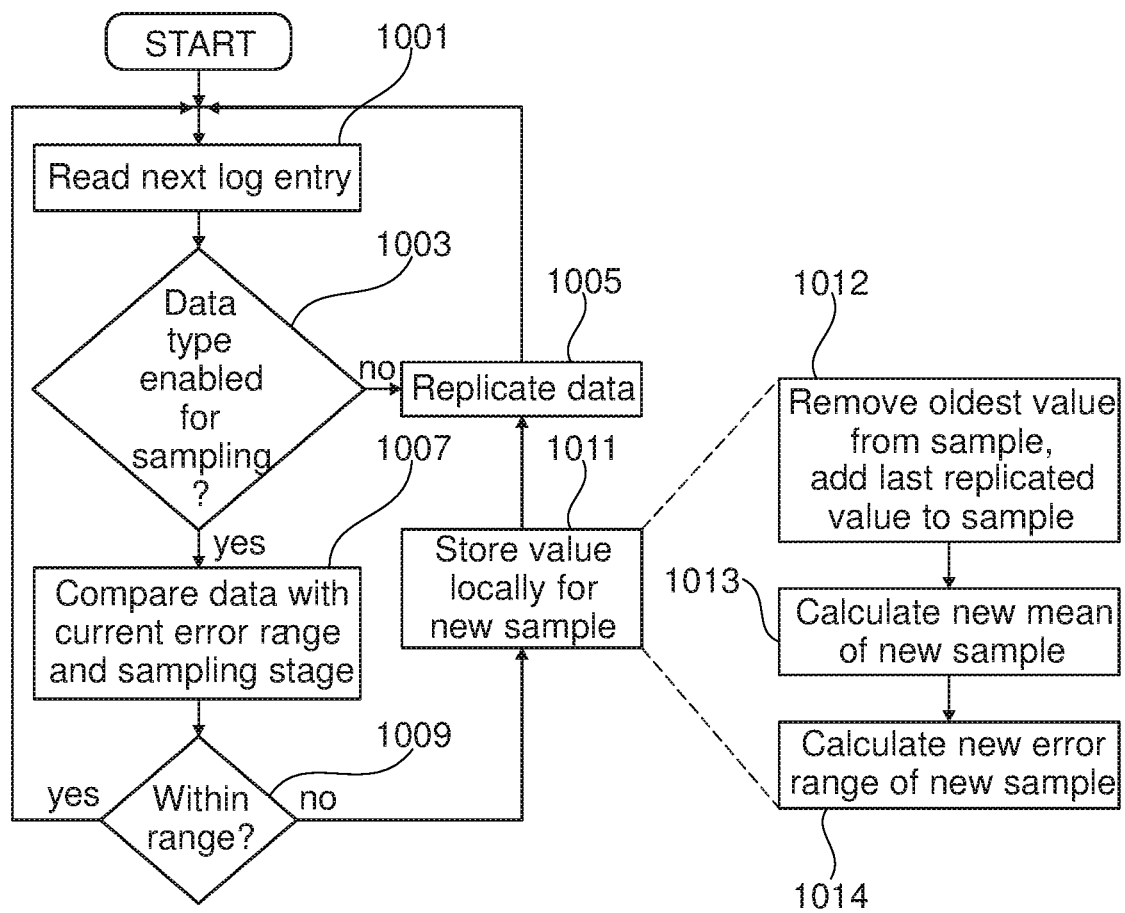
FIG. 10 is a flowchart of a sampling method in accordance with an example of the present subject matter.

FIG. 10 is a flowchart of a sampling method in accordance with an example of the present subject matter. The log entry of the transaction log may be read in step 1001. It may be determined (step 1003) whether the data type is enabled for sampling e.g., it may be determined whether the changed attribute value of the log entry represents an attribute X of the first type. In case the data type is not enabled for sampling, the change of the log entry may be replicated in step 1005. In case the data type is enabled for sampling, the data of the log entry may be compared in step 1007 with the current error range or tolerance range. The tolerance range may be computed as described with FIGS. 9A-C using a history of last N values of the attribute X. It may be determined in step 1009 whether the attribute value is within the range. If the attribute value is within the range nothing happens in the sense that the change is not replicated and next log entry is processed. If the attribute value is not within the range, the attribute value may be stored locally for a new sample in step 1011 and the change may be replicated in step 1005. Storing locally the attribute value for a new sample may comprises steps 1012 to 1014. In step 1012, the oldest value of the m values of the attribute X may be removed and the attribute value may be added. A new mean may be computed in step 1013. And a new error range may be computed in step 1014. Thus, as depicted in FIG. 10, an important criterion for the decision to replicate sampled data is the so-called "error range" or "tolerance range". In other words, based on the history of data changes in the past, the possible loss of information is assessed, and replication will not occur if the assumed information loss is not significant. As soon as the tolerance range is exceeded, a significant loss of information is assumed, and data will be replicated. Then the history, which serves as basis for calculation, is refreshed for next assessments.

The present subject matter may comprise the following clauses.

Clause 1. A computer implemented method for synchronizing a first database with a second database, the first database comprising a set of attributes, the method comprising a replication method comprising: in response to detecting a change indicating a value of at least one selected attribute of the set of attributes, determining whether the change fulfils a defined tolerance range; in response to determining that the change fulfils the tolerance range, preventing replication of the change to the second database; otherwise, replicating the change to the second database.

Clause 2. The method of clause 1, further comprising selecting a subset of the attributes of the set of attributes based on data sources of the attributes; wherein the at least one selected attribute is part of the subset of attributes.

Clause 3. The method of clause 2, the replication method further comprising in response to detecting a change of an attribute which is not part of the subset of attributes, replicating the change to the second database.

Clause 4. The method of clause 1 or 2, wherein values of the subset of attributes are streamed from a streaming source.

Clause 5. The method of any of the preceding clauses 1 to 4, the determining whether the change fulfils the defined tolerance range comprising: determining whether the value is within the defined tolerance range; or determining whether a value of a user defined function of the at least one specific attribute is within the defined tolerance range.

Clause 6. The method of any of the preceding clauses 1 to 5, the at least one specific attribute comprising multiple attributes, the determining whether the change fulfils the defined tolerance range comprising: determining whether the value of each of the specific attributes is within the defined tolerance range; or determining whether a value of a user defined function of the specific attributes is within the defined tolerance range.

Clause 7. The method of any of the preceding clauses 1 to 6, the tolerance range being a dynamically determined range or a fixed tolerance range.

Clause 8. The method of any of the preceding clauses 1 to 4 or 6, the determining whether the change fulfils the defined tolerance range comprising: determining whether a difference between the received value and a last value of the selected attribute is within the defined tolerance range.

Clause 9. The method of any of the preceding clauses 1 to 8, further comprising: upon detecting the change, determining an upper limit and a lower limit of the tolerance range using respectively a maximum value and minimum value of a last N values of the selected attribute respectively, where N>1.

Clause 10. The method of any of the preceding clauses 1 to 9, further comprising: determining whether a performance parameter of the first and second database exceeds a threshold; in response to determining that the performance parameter exceeds the threshold activating a conditional replication function, thereby performing the replication method.

Clause 11. The method of clause 10, further comprising deactivating the conditional replication function in response to determining that the performance parameter does not exceed the threshold and performing a default replication method comprising in response to detecting a change of an attribute of the set of attributes, replicating the change to the second database.

Clause 12. The method of clause 10 or 11, the performance parameter being at least one of: system load and system latency.

Clause 13. The method of any of the preceding clauses 2 to 12, comprising a logging method; the logging method comprising for each received change: determining whether the change involves one or more attributes of the subset of attributes; in response to determining that the change involves one or more attributes of the subset of attributes, adding a log entry indicating the change and log metadata of first type; in response to determining that the change does not involve one or more attributes of the subset of attributes, adding a log entry indicating the change and log metadata of second type; wherein the replication method further comprises: sequentially reading each log entry of a current non-read set of log entries, wherein detecting the change indicating the value of the at least one selected attribute of the set of attributes comprises determining that the log metadata of the log entry is of the first type.

Clause 14. The method of clause 13, the logging method and the replication method being asynchronously executed.

Clause 15. The method of clause 13 or 14, further comprising determining a latency based on a current log entry and a last log entry of the set of log entries; performing the replication method in case the latency does not exceed a threshold.

The present invention may be a system, a method, and/or a computer program product at any possible technical detail level of integration. The computer program product may include a computer readable storage medium (or media) having computer readable program instructions thereon for causing a processor to carry out aspects of the present invention. A 'processor' as used herein encompasses an electronic component which is able to execute a program or machine executable instruction or computer executable code. The processor may for instance be a multi-core processor. A processor may also refer to a collection of processors within a single computer system or distributed amongst multiple computer systems. The computer executable code may be executed by multiple processors that may be within the same computing device or which may even be distributed across multiple computing devices.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for synchronizing a first database with a second database, the first database comprising a set of attributes stored in a table with corresponding attribute values, the computer implemented method comprising a replication method comprising:
reading a first log entry in a transaction log that indicates a first attribute value change within the table of the first database;
determining that the first attribute value change of a selected attribute of the set of attributes in the first database fulfils a defined tolerance range based on the first attribute value change within the table of the first database;

preventing replication of the first attribute value change to the second database in response to determining that the first attribute value change fulfils the tolerance range;
reading a second log entry in the transaction log that indicates a second attribute value change within the table of the first database;
determining that the second attribute value change of the selected attribute in the first database does not fulfil the defined tolerance range based on the second attribute value change within the table of the first database;
replicating the second attribute value change to the second database in response to determining that the second attribute value change does not fulfil the tolerance range; and
selecting a subset of the attributes of the set of attributes based on data sources of the attributes;
wherein the selected attribute is part of the subset of attributes, wherein the computer implemented method further comprises a logging method, wherein, for each received attribute value change, the logging method comprises:
determining that the first attribute value change involves one or more attributes of the subset of attributes;
adding the first log entry indicating the first attribute value change and log metadata of a first type to the transaction log in response to determining that the first attribute value change involves one or more attributes of the subset of attributes; and
adding the second log entry indicating the first attribute value change and log metadata of a second type to the transaction log in response to determining that the first attribute value change does not involve one or more attributes of the subset of attributes;
wherein the replication method further comprises:
sequentially reading each log entry of a current non-read set of log entries;
wherein detecting the first attribute value change of the selected attribute of the set of attributes comprises determining that the log metadata of the first or second log entry is of the first type.

2. The computer implemented method of claim 1, wherein the first and second attribute value changes of the subset of attributes are streamed from a streaming source.

3. The computer implemented method of claim 1, wherein determining whether the first attribute value change fulfils the defined tolerance range comprises:
determining whether a value of a user-defined function of the selected attribute is within the defined tolerance range.

4. The computer implemented method of claim 1, the selected attribute comprising multiple attributes, the determining whether the first attribute value change fulfils the defined tolerance range comprising:
determining whether a value of a user-defined function of the selected multiple attributes is within the defined tolerance range.

5. The computer implemented method of claim 1, wherein the tolerance range is a dynamically determined range.

6. The computer implemented method of claim 1, wherein determining that the first attribute value change fulfils the defined tolerance range comprises determining that a difference between a received value and a last value of the selected attribute is within the defined tolerance range.

7. The computer implemented method of claim 1, further comprising determining an upper limit and a lower limit of the tolerance range using a maximum value and minimum value of a last N values of the selected attribute, respectively, upon detecting the change, wherein N>1.

8. The computer implemented method of claim 1, further comprising:
determining that a system latency of the first database exceeds a threshold; and
activating a conditional replication function which thereby performs the replication method in response to determining that the system latency exceeds the threshold.

9. The computer implemented method of claim 8, further comprising deactivating the conditional replication function in response to determining that the system latency does not exceed the threshold and performing a default replication method comprising, in response to detecting a third attribute value change of an attribute of the set of attributes, replicating the third attribute value change to the second database.

10. The computer implemented method of claim 1, wherein the logging method and the replication method are asynchronously executed.

11. The computer implemented method of claim 1, further comprising determining a latency based on a current log entry and a last log entry, wherein the replication method is performed in response to determining that the latency does not exceed a threshold.

12. A computer program product comprising a computer-readable storage medium having computer-readable program code embodied therewith, the computer-readable program code configured to perform operations of the method of claim 1.

13. A computer system for synchronizing a first database with a second database, the first database comprising a set of attributes stored in a table with corresponding attribute values, the computer system comprising:
a processor set;
a set of one or more computer-readable storage media; and
program instructions, collectively stored in the set of one or more storage media, for causing the processor set to perform a replication method comprising:
reading a first log entry in a transaction log that indicates a first attribute value change within the table of the first database;
determining that the first attribute value change of a selected attribute of the set of attributes in the first database fulfils a defined tolerance range based on the first attribute value change within the table of the first database;
preventing replication of the first attribute value change to the second database in response to determining that the first attribute value change fulfils the tolerance range;
reading a second log entry in the transaction log that indicates a second attribute value change within the table of the first database;
determining that the second attribute value change of the selected attribute in the first database does not fulfil the defined tolerance range based on the second attribute value change within the table of the first database;
replicating the second attribute value change to the second database in response to determining that the second attribute value change does not fulfil the tolerance range; and
selecting a subset of the attributes of the set of attributes based on data sources of the attributes;

wherein the selected attribute is part of the subset of attributes, wherein the program instructions further cause the processor set to perform a logging method, wherein, for each received attribute value change, the logging method comprises:

determining that the first attribute value change involves one or more attributes of the subset of attributes;

adding the first log entry indicating the first attribute value change and log metadata of a first type to the transaction log in response to determining that the first attribute value change involves one or more attributes of the subset of attributes; and adding the second log entry indicating the first attribute value change and log metadata of a second type to the transaction log in response to determining that the first attribute value change does not involve one or more attributes of the subset of attributes;

wherein the replication method further comprises:

sequentially reading each log entry of a current non-read set of log entries;

wherein detecting the first attribute value change of the selected attribute of the set of attributes comprises determining that the log metadata of the first or second log entry is of the first type.

14. The computer system of claim 13, wherein the logging method and the replication method are asynchronously executed.

15. The computer system of claim 13, wherein the program instructions further cause the processor set to determine a latency based on a current log entry and a last log entry, wherein the replication method is performed in response to determining that the latency does not exceed a threshold.

* * * * *